Patented Feb. 6, 1945

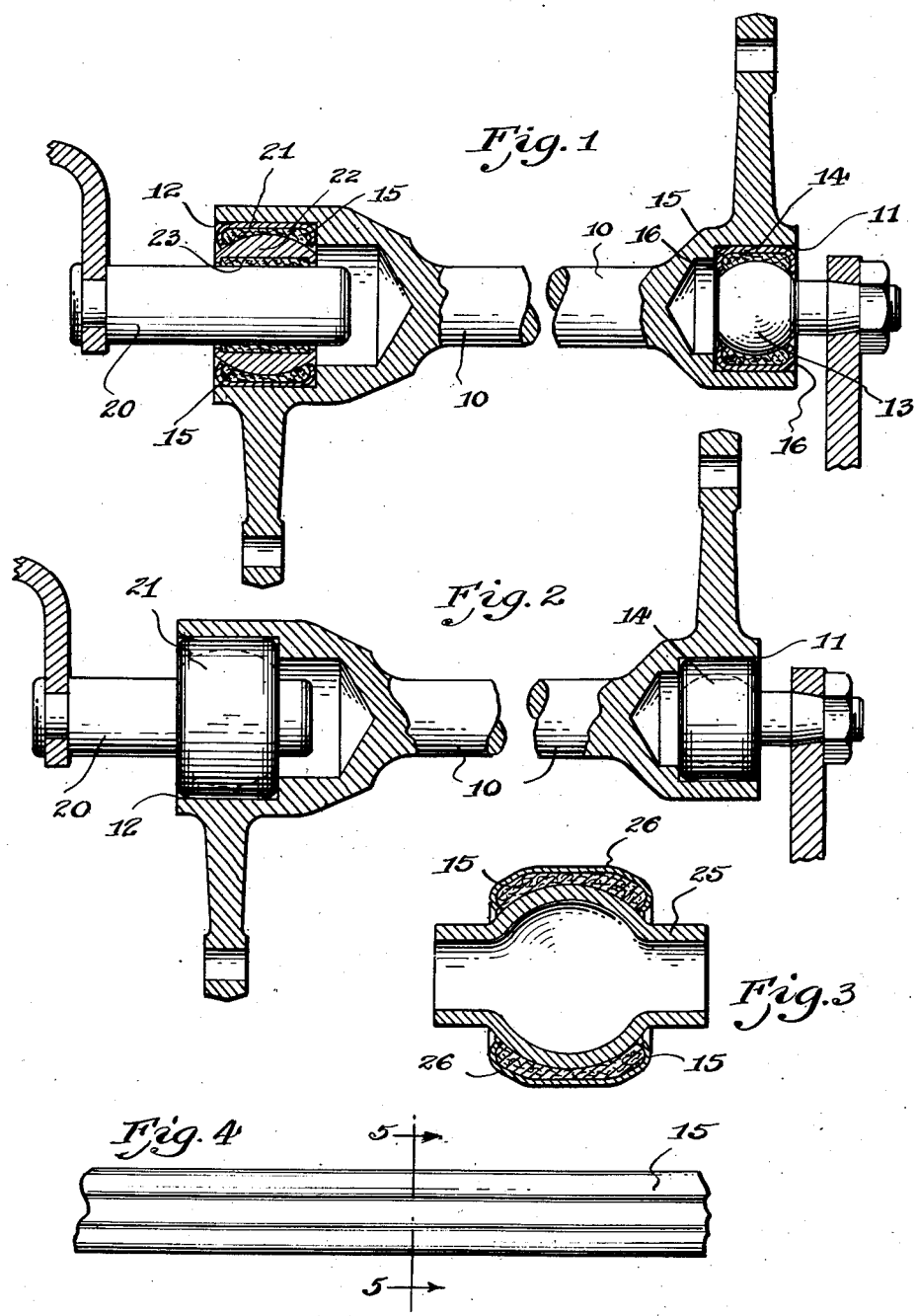

2,368,886

UNITED STATES PATENT OFFICE 2,368,886

SELF-LUBRICATING BEARING

Bruno Schroeter, Detroit, Mich., assignor to O. & S. Bearing Company, Detroit, Mich., a corporation of Michigan Application September 13, 1940, Serial No. 356,640

4 Claims. (Cl. 308—72)

This invention relates to a self-lubricating bearing and has particularly to do with that type of bearing in which a bushing member is applied to an inner bearing member under great pressure with an impregnated fibrous material between the two.

It is many times desirable to form these self-lubricating bearings around an inner bearing member which has varying contour as, for example, a ball-joint connection. The fibrous material used is usually formed from a strip of woven material such as cotton and in the past it has been the practice to take flat strips of this material and form it around the inner member, under great pressure, when the outer member is applied. The resulting distortion of the fibrous material has caused considerable weakening of the material because of the cutting of the fibers as it was distorted.

The present invention relates to a particular type of fibrous bearing material which avoids these difficulties. It relates also to a bearing design in which a preshaped fibrous material may be used whereby the resulting bearing has a cylindrical formation which is easily mounted.

Other objects and features of the invention will be further brought out in the following description and claims.

In the drawing:

Fig. 1 is a sectional view of a piece illustrating two types of bearings embodying the present invention.

Fig. 2 is a similar view of the outer casings in elevation.

Fig. 3 is a modified type of bearing illustrating the same invention.

Fig. 4 is a plan view of the lubricating material in strip form.

Fig. 5 is a section on the lines 5—5 of Fig. 4.

Referring to the drawing, Fig. 1 shows an arm 10 having cylindrical bearing recesses 11 and 12 at each end thereof. At the right end, as viewed in the drawing, a ball and socket joint is to be provided and at the left is provided a cylindrical and ball joint combined.

The socket joint consists of a ball ended stud 13 and a shell 14 with an impregnated fibrous bushing material 15 between the shell and the ball. The joint is formed by wrapping a strip of material, such as shown in Figs. 4 and 5, around the ball 13 after the material has been impregnated with a lubricating compound. One side of the strip 15 is formed in the weaving to fit substantially the contour of the ball member 13 leaving the other side relatively cylindrical in shape. The shell 14 can then be applied and the material 15 compressed under suitable pressure, the ends 16 of the shell member being bent around to lock the fibrous material in place under pressure. The shell 14 then is in the proper position to be received by the cylindrical hole 11 in the arm 10 and the bearing may be press fitted into the hole 11.

At the left end of arm 10, as shown in Fig. 1, is a cylindrical type of bearing which consists of a stud 20, a bushing 21 and an intermediate member 22. A flat strip of lubricant impregnated material 23 is positioned between the intermediate member 22 and the stud 20. A preshaped strip 15 may then be wrapped around the intermediate member 22 which has the spherical contour and the outer shell 21 applied, as previously described in connection with shell 14. The entire assembly may then be pressed into the opening 12 in arm 10. The result is a composite joint in which the stud 20 may pivot, slide and rotate.

A similar type of joint is shown in Fig. 3 where a stud 25 is located within a shell 26, the preshaped bushing material 15 being pressed between the two. The advantage of the preshaped material is that under the extreme pressures that are used in pressing these bushings over the stud, a flat strip of material would have to flow and flatten out at the narrowest point between the two members. It has been found in actual practice that this flow will not take place but that, at the point where the threads of the fabric cross, there will be a cutting and consequently a premature disintegration of the fabric. By utilizing the preshaped material, the flow that is left for the fabric is reduced to a minimum and furthermore, a cylindrical bushing may result since it is unnecessary to move the corners of the shell down toward the ball as far as was previously necessary to obtain good bearing contact all around the joint. The old method is illustrated in Patents Nos. 1,817,529 and 2,027,560. In the latter patent it was necessary to provide a tapered cap to locate the complete bushing in a cylindrical recess. With the present bearing no such provision is necessary.

I claim:

1. A self-aligning, self-lubricating bearing comprising an inner bearing member of longitudinally varying contour, and an outer bearing member comprising a bushing having a substantially cylindrical shape with the ends shaped around toward the inner bearing member, and a strip of compressed impregnated lubricating bushing material positioned between said inner member and said outer member comprising a shaped woven strip preformed in cross-section when woven to conform on one side to the shape of the inner bearing member and on the other side to the shape of the outer bearing member when wrapped around said inner bearing member.

2. A self-aligning, self-lubricating bearing assembly comprising an inner bearing member of longitudinally varying contour, a strip of impregnated lubricating fibrous woven material wrapped around said member and preformed in cross-section when woven whereby the inner surface is shaped to conform substantially to the contour of the inner bearing member and the outer surface remains substantially cylindrical, and an outer retaining member substantially cylindrical in shape compressed over said fibrous material to hold the same under compression around said inner member.

3. A self-aligning, self-lubricating bearing assembly comprising an inner bearing member of longitudinally varying contour, a strip of impregnated lubricating fibrous woven material wrapped around said member and preformed in cross-section when woven whereby the inner surface is shaped to conform substantially to the contour of the inner bearing member and the outer surface remains substantially cylindrical, an outer retaining member substantially cylindrical in shape compressed over said fibrous material to hold the same under compression around said inner member, and a cylindrical bearing socket for receiving said bearing assembly.

4. A self-aligning, self-lubricating bearing assembly comprising an inner bearing and an outer bearing member, at least one of said members having a longitudinally varying contour, a strip of impregnated lubricating fibrous woven material positioned between said members and preformed in cross-section when woven and prior to assembly to conform substantially to the contour of said bearing members, said preformed material being compressed between said bearing members and the bearing members being shaped and cooperating to permanently hold said compressed preformed material in position.

BRUNO SCHROETER.